(12) United States Patent
Kawamoto (10) Patent No.: US 6,254,202 B1
(45) Date of Patent: *Jul. 3, 2001

(54) VEHICLE BRAKING APPARATUS

(75) Inventor: Yoshimichi Kawamoto, Saitama (JP)

(73) Assignee: Honda Giken Kogyo Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/150,327

(22) Filed: Sep. 9, 1998

(30) Foreign Application Priority Data

Sep. 10, 1997 (JP) .................................... 9-245110

(51) Int. Cl.[7] ........................................ B60T 8/88
(52) U.S. Cl. .......................... 303/122.09; 303/116.2; 303/9; 303/191
(58) Field of Search ................. 303/9, 116.1, 116.2, 303/113.2, 122.09, 122.11, 122.1, 191, 192

(56) References Cited

U.S. PATENT DOCUMENTS 5,278,764 * 1/1994 Iizuka et al. ..................... 364/461
5,709,438 * 1/1998 Isakson et al. ................... 303/116.1
5,947,566 * 9/1999 Tobisawa et al. ................ 303/116.1

* cited by examiner

Primary Examiner—Robert J. Oberleitner
Assistant Examiner—Devon Kramer
(74) Attorney, Agent, or Firm—Carrier, Blackman & Associates, P.C.; Joseph P. Carrier; William D. Blackman (57) ABSTRACT

A vehicle capable of performing automatic driving can be braked with a hydraulic braking pressure produced by a master cylinder having a vacuum booster and a hydraulic braking pressure produced by a hydraulic pressure pump provided to an ABS/B-TCS hydraulic pressure control unit. During normal braking, the vehicle performs braking with the hydraulic braking pressure produced by the master cylinder, by controlling a linear solenoid of the vacuum booster in accordance with a command from an automatic driving electronic control unit. If an insufficient braking force is obtained from the hydraulic braking pressure produced by the master cylinder or a failure occurs in the braking system of the master cylinder, the vehicle performs emergency braking with the hydraulic braking pressure produced by the hydraulic pressure pump of the ABS/B-TCS hydraulic pressure control unit HU.

16 Claims, 5 Drawing Sheets

VEHICLE BRAKING APPARATUS

BACKGROUND OF THE INVENTION

1. Field of the Invention

The present invention relates to a vehicle braking apparatus capable of operating a brake cylinder with a hydraulic braking pressure produced by a master cylinder connected to a vacuum booster and a hydraulic braking pressure produced by a hydraulic pressure pump.

2. Description of the Related Art

A vehicle which travels while automatically maintaining a predetermined intervehicular distance from a preceding vehicle requires an automatic braking apparatus for decelerating the vehicle when the intervehicular distance is short. As such an automatic braking apparatus, it is known that there is an apparatus which causes a master cylinder to produce a predetermined hydraulic braking pressure and operates a brake cylinder by controlling a vacuum booster associated with the master cylinder by means of a linear solenoid.

However, the hydraulic braking pressure which can be produced by the vacuum booster and the master cylinder is not always sufficiently high, and there is a possibility that the required braking force may not be obtained in case of emergency such as panic braking. It is also necessary to provide some kind of backup function to prepare for the occurrence of a failure in the vacuum booster or the master cylinder.

SUMMARY OF THE INVENTION

The present invention has been made in view of the above-described limitation of the known apparatus, and its object is to add an emergency backup function to a braking apparatus which produces a hydraulic braking pressure by means of a vacuum booster and a master cylinder.

To achieve the above object, a first feature of the present invention is the provision of a vehicle braking apparatus capable of operating a brake cylinder with a hydraulic braking pressure produced by a master cylinder connected to a vacuum booster and a hydraulic braking pressure produced by a hydraulic pressure pump, comprising: normal mode braking means for operating the brake cylinder with the hydraulic braking pressure produced by the master cylinder; and emergency mode braking means for operating the brake cylinder with the hydraulic braking pressure increased by the hydraulic pressure pump when an insufficient braking force is obtained from the hydraulic braking pressure produced by the master cylinder.

According to the above construction, it is possible to minutely control the braking force by performing braking with the normal mode braking means using the hydraulic braking pressure produced by the master cylinder during normal braking. In case of emergency in which an insufficient braking force is obtained from the hydraulic braking pressure produced by the master cylinder, the required braking force can be ensured by performing braking with the hydraulic braking pressure produced by the hydraulic pressure pump.

A second feature of the present invention, in addition to the first feature, is a vehicle braking apparatus wherein the emergency mode braking means operates the brake cylinder when a target deceleration is at least a predetermined value.

According to the above construction, even if a large target deceleration is required to be achieved by the emergency mode braking means, and such target deceleration cannot be achieved by the normal mode braking means with the hydraulic braking pressure produced by the master cylinder, it is possible to achieve the target deceleration by performing braking with the emergency mode braking means using the hydraulic braking pressure produced by the hydraulic pressure pump. Although the predetermined value is set to be 0.6G in a given embodiment, such a value is a matter of design variation which can be arbitrarily determined.

A third feature, in addition to the first feature, is a vehicle braking apparatus wherein the emergency mode braking means operates the brake cylinder when a braking system associated with the vacuum booster and the master cylinder fails.

According to the above construction, even if the braking system associated with the vacuum booster and the master cylinder fails, it is possible to perform braking with the hydraulic braking pressure produced by the hydraulic pressure pump.

A fourth feature, in addition to the first feature, is a vehicle braking apparatus wherein the hydraulic pressure pump is also used for at least one of an anti-lock braking system and a brake traction control system.

According to the above construction, during the emergency in which the required braking force is not obtained from the hydraulic braking pressure produced by the master cylinder, appropriate braking is performed by using the hydraulic pressure pump of the anti-lock braking system or the brake traction control system. Accordingly, since it is unnecessary to use a special hydraulic pressure pump, a reduction in cost can be realized.

The above and other objects, features and advantages of the present invention will become apparent from the following detailed description of a preferred embodiment, with reference to the accompanying drawings.

BRIEF DESCRIPTION OF THE DRAWINGS

FIGS. 1 to 5 illustrate a preferred embodiment of the present invention, wherein:

DESCRIPTION OF THE PREFERRED EMBODIMENT

A preferred embodiment of the present invention will be described below with reference to the accompanying drawings.

Figure 1:
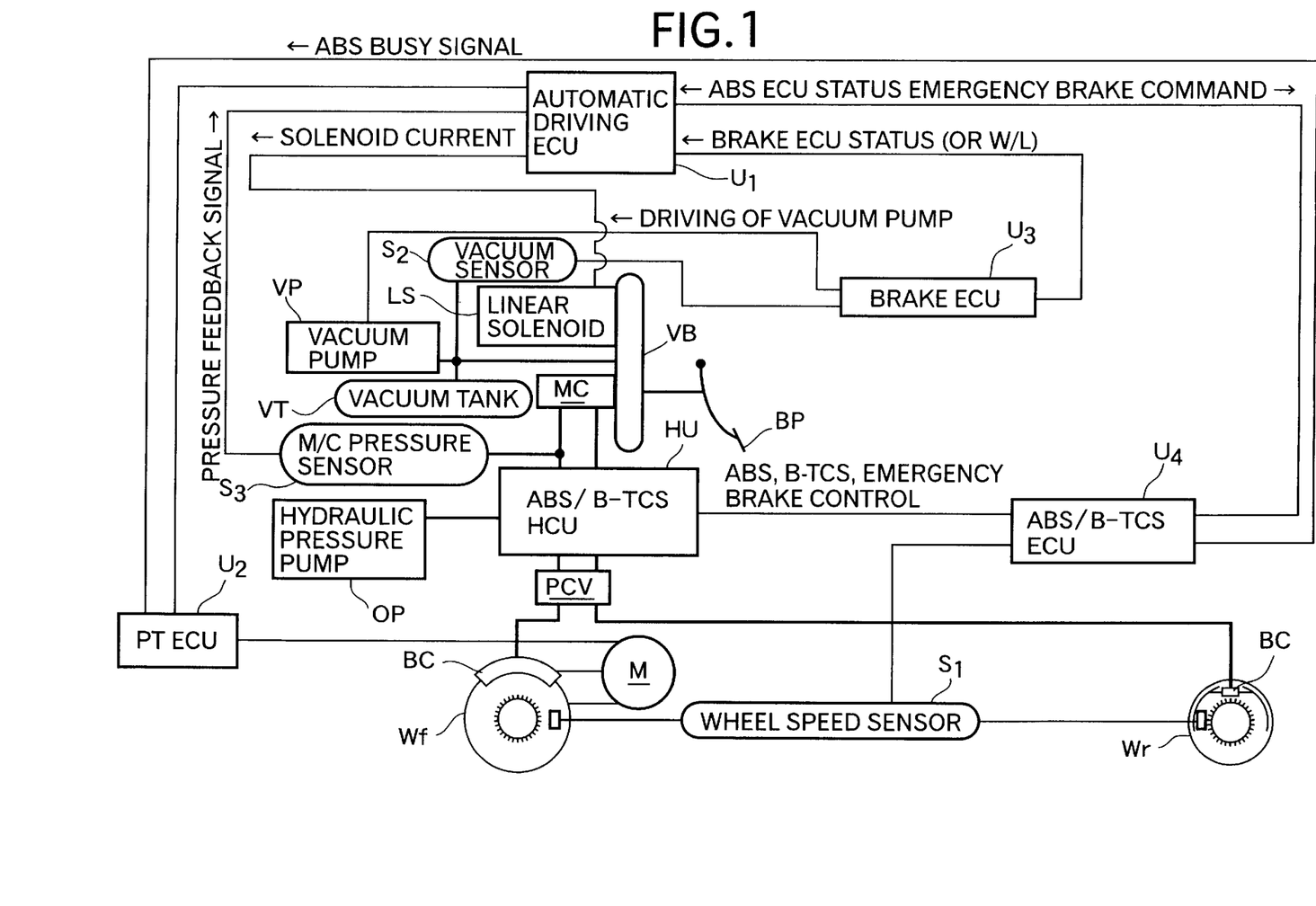
FIG. 1 is a block diagram generally showing relevant parts of the entire construction of a vehicle provided with a braking apparatus according to the embodiment of the present invention.

FIG. 1 shows a vehicle which is provided with a front wheel Wf which is a driven wheel connected to a motor M and a rear wheel Wr which is a follower wheel. This vehicle can, of course, be driven by a driver and can also be automatically driven by an automatic driving electronic control unit $U_1$. The motor M connected to the driven wheel Wf is driven on the basis of the operation of an accelerator pedal by the driver, and is controlled by a power train electronic control unit $U_2$ connected to the automatic driving electronic control unit $U_1$, during automatic driving.

The front wheel Wf and the rear wheel Wr are respectively provided with brake cylinders BC, and a master cylinder MC which is integrally provided with a vacuum booster VB connected to a vacuum tank VT and a vacuum pump VP is provided so as to supply a hydraulic braking pressure to the brake cylinders BC. The vacuum booster VB is not only operated by a brake pedal BP operated by the driver, but can also be operated by a linear solenoid LS during automatic driving. A hydraulic pressure control unit HU which is provided with a hydraulic pressure pump OP is interposed between the master cylinder MC and the brake cylinders BC. A proportional pressure-reducing valve PCV is interposed between the hydraulic pressure control unit HU and the brake cylinder BC of the front wheel Wf.

When it is detected during braking that the wheels tend to lock, on the basis of the output from a wheel speed sensor $S_1$, the hydraulic pressure control unit HU executes so-called anti-lock brake control which cancels the locking tendency and ensures braking force by repeatedly reducing, holding and increasing hydraulic braking pressure. When it is detected during the start of a driving operation or the like of the vehicle that the driven wheels have slipped, on the basis of the output from the wheel speed sensor $S_1$, the hydraulic pressure control unit HU executes so-called brake traction control which brakes the driven wheels to inhibit the slip. The proportional pressure-reducing valve PCV sets the braking force of the rear wheel Wr weaker than the braking force of the front wheel Wf, and appropriately holds the distribution of braking force between the front and rear wheels Wf and Wr.

A brake electronic control unit $U_3$ controls the operation of the vacuum pump VP on the basis of the internal pressure of the vacuum tank VT which is detected by a vacuum sensor $S_2$. An ABS/B-TCS electronic control unit $U_4$ for an anti-lock braking system and a brake traction control system controls the operation of the hydraulic pressure control unit HU on the basis of the vehicle speed detected by the wheel speed sensor $S_1$, and also operates the hydraulic pressure control unit HU on the basis of an emergency brake command from the automatic driving electronic control unit $U_1$, thereby executing emergency braking. The automatic driving electronic control unit $U_1$ controls the operation of the linear solenoid LS of the vacuum booster VB on the basis of status signals from the brake electronic control unit $U_3$ and the ABS/B-TCS electronic control unit $U_4$, a master cylinder pressure feedback signal from a master cylinder pressure sensor $S_3$, and data about obstacles detected by an obstacle sensor (not shown) such as a laser radar, and controls supply of a predetermined hydraulic braking pressure produced by the master cylinder MC to the brake cylinders BC.

Figure 2:
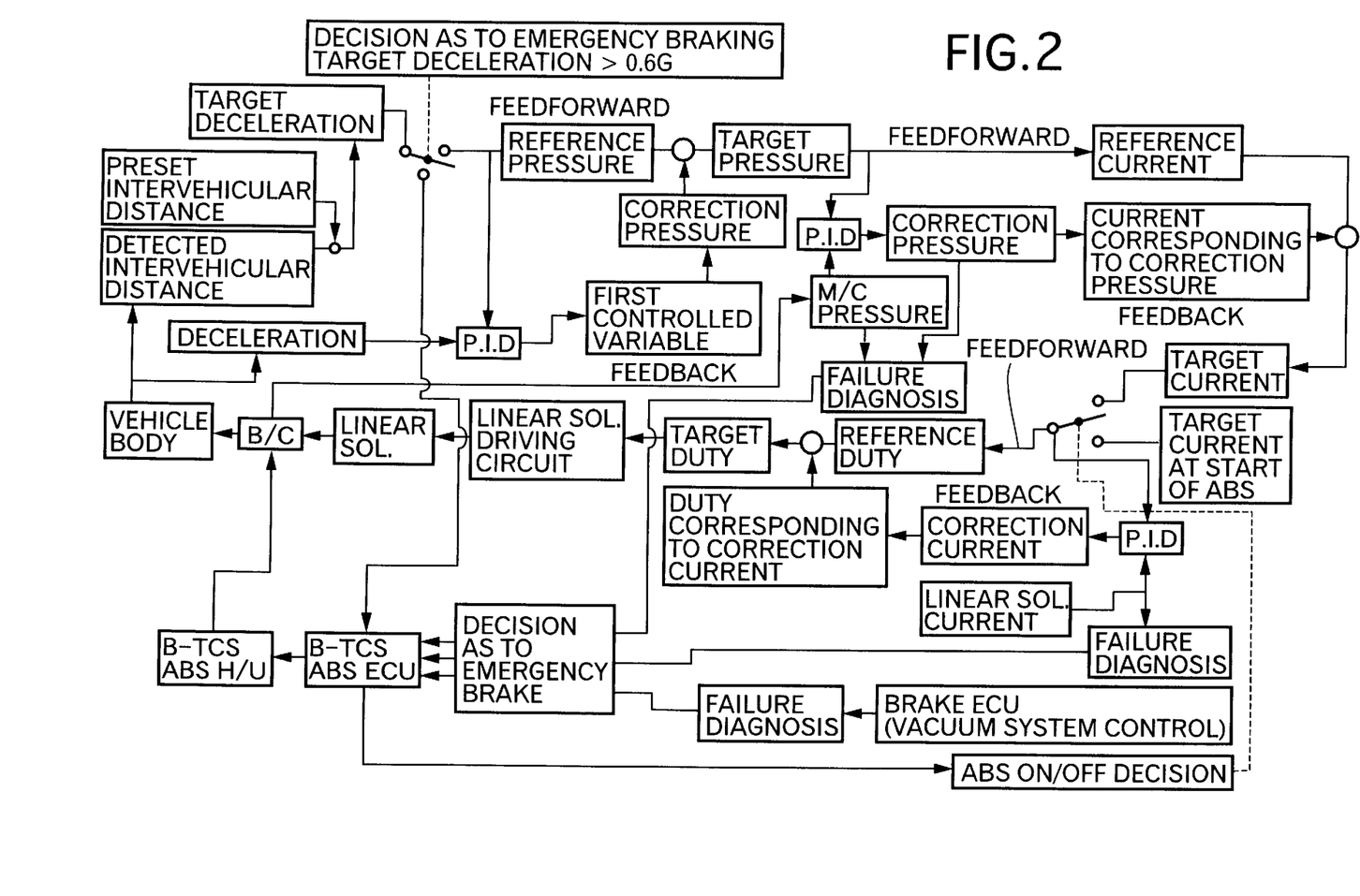
FIG. 2 is a block diagram of a control system thereof.
Figure 3:
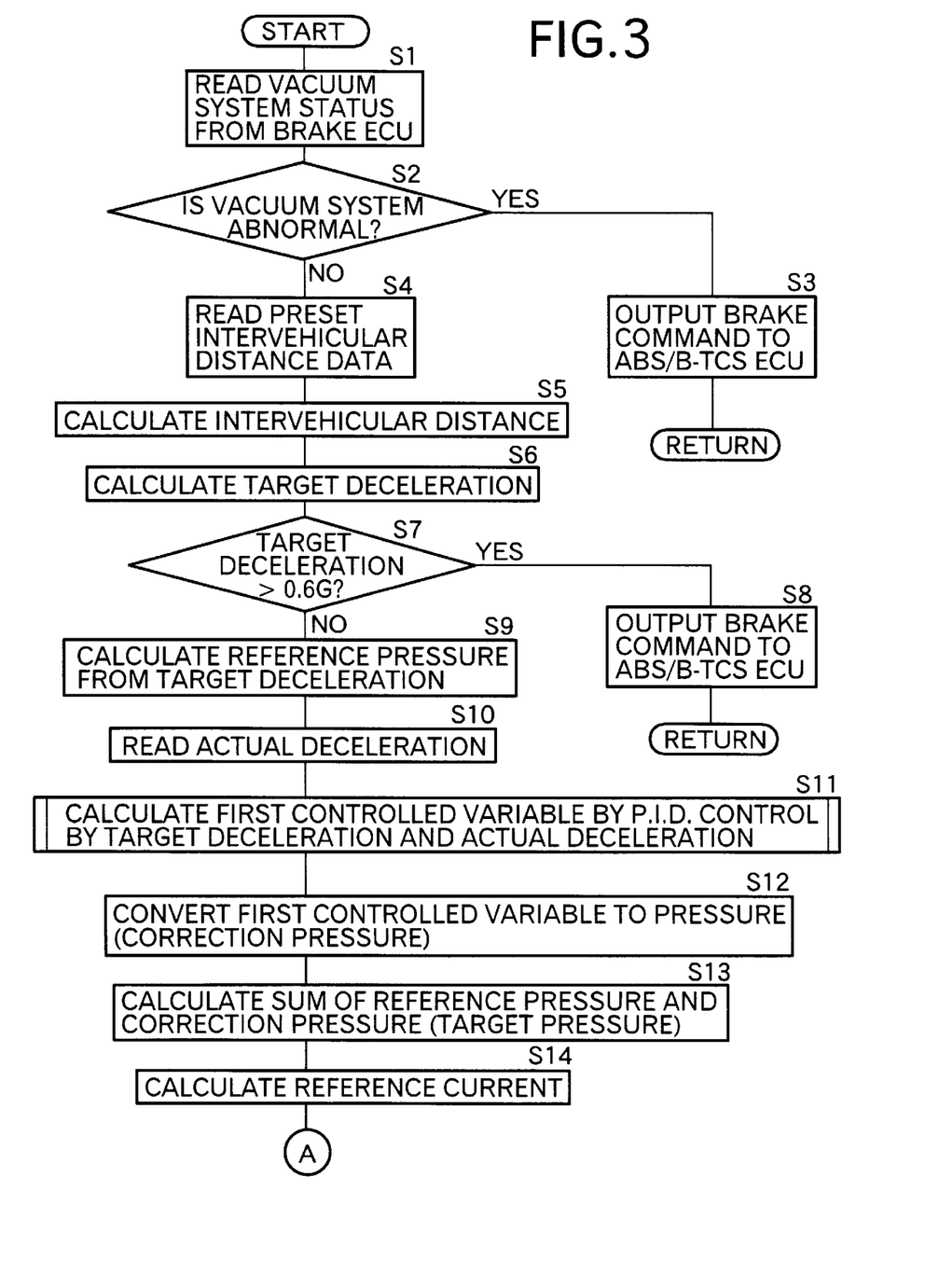
FIG. 3 is a first partial flowchart which illustrates the braking operation of an automatic driving electronic control unit.
Figure 4:
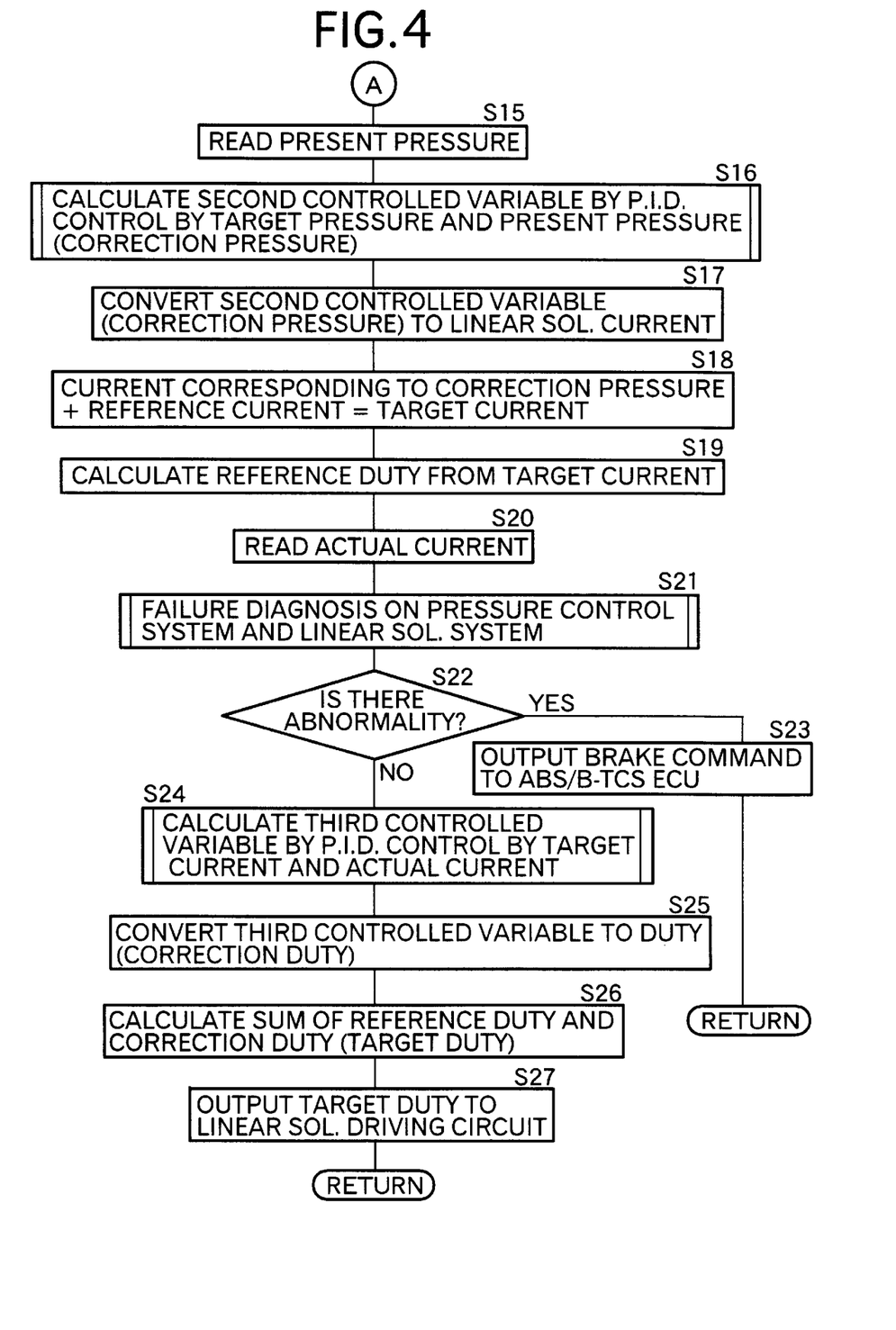
FIG. 4 is a second partial flowchart which illustrates the braking operation of the automatic driving electronic control unit.

The braking operation of the automatic driving electronic control unit $U_1$ will be described below with reference to the block diagram shown in FIG. 2 and the flowcharts shown in FIGS. 3 and 4.

First, in Step S1, the internal pressure of the vacuum tank VT which has been detected by the vacuum sensor $S_2$ is read and sent to the automatic driving electronic control unit $U_1$ the brake electronic control unit $U_3$. Then, in Step S2, if there is an abnormality in a vacuum system including the vacuum pump VP, the vacuum tank VT and the vacuum sensor $S_2$, it is determined that it is impossible to perform normal braking which causes the vacuum booster VB to operate the master cylinder MC to produce hydraulic braking pressure, and the process proceeds to Step S3, in which a four-wheel braking command is outputted to the ABS/B-TCS electronic control unit $U_4$. The ABS/B-TCS electronic control unit $U_4$ which has received the four-wheel braking command supplies the hydraulic braking pressure produced by the hydraulic pressure pump OP of the hydraulic pressure control unit HU in order to effect emergency braking, to the brake cylinders BC of the respective front wheel Wf and rear wheel Wr.

If there is no abnormality in the vacuum system in Step S2, the process proceeds to Step S4, in which a preset intervehicular distance corresponding to the vehicle speed or the like at the present time is read in, and, in Step S5, the intervehicular distance from the preceding vehicle is detected on the basis of the output from the obstacle sensor such as the laser radar mentioned above. Then, in Step S6, a target deceleration required to maintain the preset intervehicular distance is calculated by comparing the preset intervehicular distance and the detected intervehicular distance. Then, in Step S7, if the target deceleration exceeds 0.6G (G: gravitational acceleration), it is judged that an insufficient braking force is obtained from the hydraulic braking pressure produced by the vacuum booster VB and the master cylinder MC, and the process proceeds to Step S8, in which a four-wheel braking command is outputted to the ABS/B-TCS electronic control unit $U_4$. Accordingly, in a manner similar to Step S3, the hydraulic pressure control unit HU supplies the hydraulic braking pressure produced by the hydraulic pressure pump OP to the brake cylinders BC of the respective front wheel Wf and rear wheel Wr, on the basis of a command from the ABS/B-TCS electronic control unit $U_4$, and executes emergency braking with a deceleration exceeding 0.6G.

If it is judged in Step S7 that the target deceleration is 0.6G or less and the required braking force is obtained from the hydraulic braking pressure produced by the vacuum booster VB and the master cylinder MC, the process proceeds to Step S9, in which a reference pressure which is the hydraulic braking pressure required to obtain the target deceleration is calculated. Then, in Step S10, an actual deceleration of the vehicle body is detected, and in Step S11, the target deceleration is compared with the actual deceleration to calculate a first controlled variable by PID control. In Step S12, a correction pressure is calculated by converting the first controlled variable to a hydraulic braking pressure, in Step S13, the reference pressure is added to the correction pressure to calculate a target pressure, and in Step S14, the target pressure is converted to a reference current to be supplied to the linear solenoid LS of the vacuum booster VB.

Then, in Step S15, the present pressure which is being produced by the master cylinder MC is read in, in Step S16, the target pressure is compared with the present pressure to calculate a second controlled variable corresponding to the correction pressure by PID control, and in Step S17, the second controlled variable is converted to a current corresponding to the correction pressure of the linear solenoid LS. Then, in Step S18, the reference current is added to the current corresponding to the correction pressure, to calculate a target current of the linear solenoid LS. Then, in Step S19, the target current is converted to a reference duty, and in Step S20, the actual current of the linear solenoid LS is read in.

Then, in Step S21, the present pressure which is being produced by the master cylinder MC, the correction pressure (refer to Step S16) and the actual current of the linear solenoid LS are respectively compared with predetermined reference values to perform a failure diagnosis on the pressure control system and the linear solenoid system. If it is judged in Step S22 that there is an abnormality, the process proceeds to Step S23, in which, in a manner similar to Step S3, the hydraulic pressure control unit HU supplies the hydraulic braking pressure produced by the hydraulic pressure pump OP to the brake cylinders BC of the respective front wheel Wf and rear wheel Wr, on the basis of a command from the ABS/B-TCS electronic control unit $U_4$, and executes emergency braking.

If it is judged in Step S22 that there is no abnormality, the process proceeds to Step S24, in which the target current is compared with the actual current to calculate a third controlled variable corresponding to the correction current by PID control. Then, in Step S25, a duty corresponding to the correction current is calculated, and in Step S26, the reference duty is added to the duty corresponding to the correction current to calculate a target duty. Then, in Step S27, the target duty is outputted to a linear solenoid driving circuit to control the linear solenoid LS, thereby operating the vacuum booster VB and causing the master cylinder MC to produce a desired hydraulic braking pressure, whereby the brake cylinders BC can be operated. Thus, it is possible to produce an appropriate braking force during automatic driving and keep the intervehicular distance from the preceding vehicle equal to the preset intervehicular distance.

The braking operation of the ABS/B-TCS electronic control unit $U_4$ will be described below with reference to the block diagram shown in FIG. 2 and the flowchart shown in FIG. 5.

First, after an initial check has been made in Step S31, in Step S32, a failure diagnosis is performed on the ABS/B-TCS electronic control unit $U_4$, the wheel speed sensor $S_1$ the hydraulic pressure control unit HU. If it is judged in Step S33 that there is a failure, a warning lamp is turned on in Step S34, and in Step S35, an ABS down signal representing that the anti-lock braking system cannot operate is outputted.

If it is judged in Step S33 that there is no failure, the process proceeds to Step S36, and if it is judged in Step S36 that there is an emergency brake command from the automatic driving electronic control unit $U_1$, the process proceeds to Step S37, in which the four wheels are urgently braked with the hydraulic braking pressure produced by the hydraulic pressure pump OP. If it is judged in Step S36 that there is no emergency brake command, ABS control is executed in Steps S38 to S41.

Specifically, in Step S38, it is judged whether or not ABS control is needed, on the basis of the output of the wheel speed sensor $S_1$, and if it is judged in Step S39 that ABS control is needed, the process proceeds to Step S40, in which the locking of the wheels is inhibited by controlling the hydraulic braking pressure via the hydraulic pressure control unit HU. In Step S41, an ABS busy signal representing that the ABS is operating is outputted.

As described above, during normal braking, it is possible to execute minute control of braking force by performing braking with the hydraulic braking pressure produced by the vacuum booster VB and the master cylinder MC, whereas if a strong braking force of 0.6G or more is needed or any failure occurs, the hydraulic pressure pump OP is used to produce a strong braking force so that emergency braking is enabled. In addition, since the pump previously provided for the anti-lock braking system and the brake traction control system is used as the hydraulic pressure pump OP, an increase in cost over conventional systems can be minimized.

Figure 5:
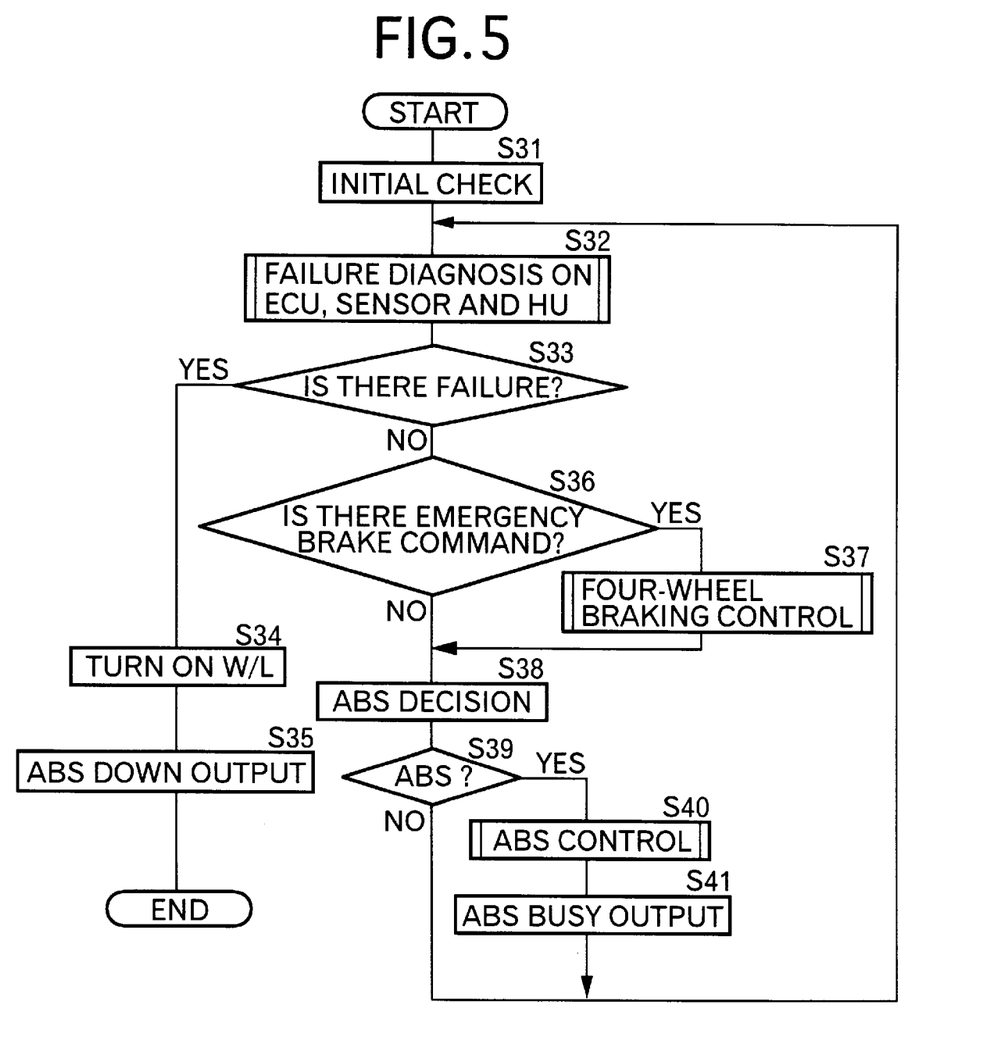
FIG. 5 is a flowchart which illustrates the braking operation of an ABS/B-TCS electronic control unit.

Although the flowchart of in FIG. 5 illustrates only the ABS function, ABS may be substituted for B-TCS so that a B-TCS function can be performed similarly to the ABS function.

Although the preferred embodiment of the present invention has been described above in detail, various design changes can be made without departing from the scope and spirit of the present invention. The scope of the invention is indicated by the appended claims rather than by the foregoing description of the preferred embodiment.

What is claimed is:

1. A vehicle braking apparatus on a vehicle capable of operating a brake cylinder with a hydraulic braking oil pressure produced by a master cylinder connected to a vacuum booster and a hydraulic braking oil pressure produced by a hydraulic pressure pump, comprising:

normal mode braking means for operating the brake cylinder with the hydraulic braking pressure produced by said master cylinder;

emergency mode braking means for operating the brake cylinder with the braking oil pressure increased by the hydraulic pressure pump when an insufficient braking force is obtained from the hydraulic braking pressure produced by said master cylinder;

means for calculating a target deceleration of the vehicle based on an operating state of the vehicle, but without depending on an amount of brake operation conducted by a driver of the vehicle;

said emergency mode braking means operates the brake cylinder when a target deceleration is at least a predetermined value;

a vacuum sensor for detecting internal pressure in a vacuum system, whereby an abnormality in the pressure in the vacuum system may be determined from an output of said vacuum sensor; and when an abnormality is detected in said vacuum system, said brake cylinder is operated with said hydraulic braking pressure increased by said hydraulic pressure pump.

2. A vehicle braking apparatus according to claim 1, wherein said emergency mode braking means operates the brake cylinder also when a braking system associated with said vacuum booster and said master cylinder fails.

3. A vehicle braking apparatus according to claim 1, wherein said hydraulic pressure pump is also used for at least one of an anti-lock braking system and a brake traction control system.

4. A vehicle braking apparatus according to claim 2, further including means for determining an abnormality of the braking system associated with said vacuum booster and said master cylinder as an indication that the system has failed.

5. A vehicle braking apparatus according to claim 4, wherein said determining means determines an abnormality in at least one of a vacuum system, a pressure control system and a linear solenoid system of the braking system.

6. A vehicle braking apparatus according to claim 1, further including:

means for detecting an intervehicular distance between said vehicle on which the apparatus is installed and a preceding vehicle; and means for determining said target deceleration based on a comparison of a intervehicular distance detected by said detecting means to a preset intervehicular distance corresponding to an operating condition of said vehicle.

7. A vehicle braking apparatus according to claim 1, wherein the vehicle includes both front and rear brake cylinders, and the apparatus operates both said front and rear brake cylinders.

8. A vehicle braking apparatus according to claim 1, further including means for providing a warning to said driver when said emergency mode braking means is actuated.

9. A vehicle braking apparatus on a vehicle comprising:

a brake cylinder;

a master cylinder connected to a vacuum booster for producing a normal hydraulic braking pressure;

a hydraulic pump for producing an emergency hydraulic braking pressure;

control means for operating the brake cylinder using said normal hydraulic braking pressure and said emergency hydraulic braking pressure;

means for calculating a target deceleration of the vehicle based on an operating state of the vehicle, but without depending on an amount of brake operation conducted by a driver of the vehicle;

said control means normally operating said brake cylinder using said normal hydraulic braking pressure, and operating said brake cylinder with said normal hydraulic braking pressure increased by said emergency hydraulic braking pressure when an insufficient braking force is obtained from the normal hydraulic braking oil pressure;

said control means operates the brake cylinder using said emergency hydraulic braking pressure when said target deceleration is at least a predetermined value;

a vacuum sensor for detecting internal pressure in a vacuum system, whereby an abnormality in the pressure in the vacuum system may be determined from an output of said vacuum sensor; and when an abnormality is detected in said vacuum system, said brake cylinder is operated with said hydraulic braking pressure increased by said hydraulic pressure pump.

10. A vehicle braking apparatus according to claim 9, wherein said control means operates the brake cylinder using said emergency hydraulic braking pressure also when a braking system associated with said vacuum booster and said master cylinder fails.

11. A vehicle braking apparatus according to claim 9, wherein said hydraulic pump is also used for at least one of an anti-lock braking system and a brake traction control system.

12. A vehicle braking apparatus according to claim 10, further including means for determining an abnormality of the braking system associated with said vacuum booster and said master cylinder as an indication that the system has failed.

13. A vehicle braking apparatus according to claim 12, wherein said determining means determines an abnormality in at least one of a vacuum system, a pressure control, system and a linear solenoid system of the braking system.

14. A vehicle braking apparatus according to claim 9, further including:

means for detecting an intervehicular distance between said vehicle on which the apparatus is installed and a preceding vehicle; and means for determining said target deceleration based on a comparison of a intervehicular distance detected by said detecting means to a preset intervehicular distance corresponding to an operating condition of said vehicle.

15. A vehicle braking apparatus according to claim 9, wherein the apparatus includes a front brake cylinder and a rear brake cylinder, and said control means operates both said front and rear brake cylinders using said normal and emergency hydraulic braking pressures.

16. A vehicle braking apparatus according to claim 9, further including means for providing a warning to said driver when said emergency mode braking means is actuated.

\* \* \* \* \*

UNITED STATES PATENT AND TRADEMARK OFFICE
CERTIFICATE OF CORRECTION

PATENT NO. : 6,254,202 B1
DATED : July 3, 2001
INVENTOR(S) : Kawamoto

It is certified that error appears in the above-identified patent and that said Letters Patent is hereby corrected as shown below:

Column 3,
Line 61, after "$U_1$" insert -- from --.

Column 5,
Line 33, after "$S_1$" insert -- and --.

Column 6,
Line 1, change "of in" to -- in --;
Line 63, change "of a" to -- of an --.

Column 8,
Line 17, after "control" delete the comma;
Line 25, change "of a" to -- of an --.

Signed and Sealed this

Twenty-sixth Day of February, 2002

Attest:

Attesting Officer

JAMES E. ROGAN
Director of the United States Patent and Trademark Office